(No Model.)
N. O. WILCOX.
Blacking Box.
No. 238,012. Patented Feb. 22, 1881.
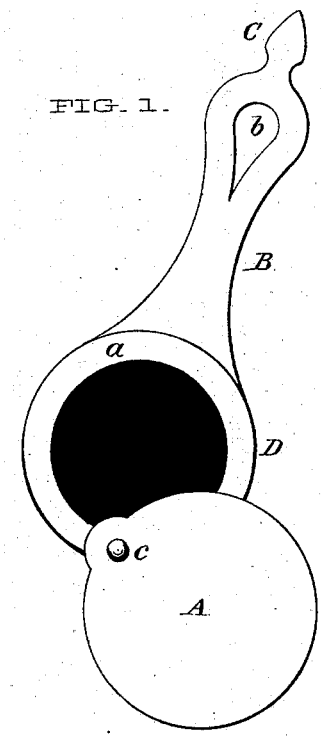
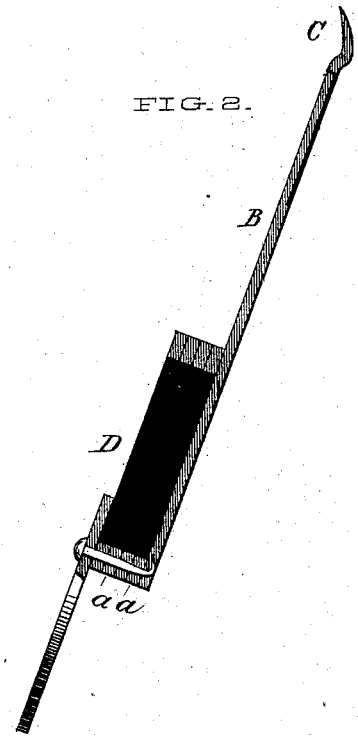
Witnesses,
H. D. Hall
C. A. Winfield.
Inventor,
Nelson O. Wilcox
by Franklin Scott Atty

UNITED STATES PATENT OFFICE.

NELSON O. WILCOX, OF BENNINGTON, VERMONT.

BLACKING-BOX.

SPECIFICATION forming part of Letters Patent No. 238,012, dated February 22, 1881.

Application filed July 23, 1880. (No model.)

*To all whom it may concern:*

Be it known that I, NELSON O. WILCOX, of the town of Bennington, in the county of Bennington and State of Vermont, have invented certain Improvements in Blacking-Boxes, of which the following is a specification.

The accompanying drawings fully illustrate my invention, Figure 1 being a top view of a blacking-box embracing my improvements, with the cover turned so as to expose the contents of the box. Fig. 2 exhibits a longitudinal section through box and handle of Fig. 1.

My invention relates to the manufacture of blacking-boxes from layers of fibrous or porous material, and to the means employed for uniting the same, and rendering the finished box substantially integral and proof against the absorption by the box of any of the ingredients of the blacking.

As a material for the construction of my box I employ papier-maché, wood-pulp board, or, preferably, common straw-board, which may be cut by dies to the proper shapes for the layer thereof, which is to constitute the handle, as at B, Fig. 1, and for the series of layers *a a*, which are to constitute the cylindrical body of the box. The cover A is made from similar material similarly cut out. Upon the handle-section B a number of rings of the straw-board *a a* are successively laid up to constitute the rim D of the box. The whole is laid up with a glue or cement which will resist the absorption of any of the constituent ingredients of the blacking, and, if necessary, the interior of both box and cover should be treated with such a preparation as will effectually resist the absorption of any special ingredient of the contents of the box, whatever the composition thereof may be. Union or adhesion of the several layers of paste or straw board may be secured by pressure while the box is drying.

The cover A may be secured to the rim of the box by a screw or tack in the usual way, as at *c*, so that the same may be turned wholly or partially around.

Having thus described my invention, what I claim as new, and desire to secure by Letters Patent, is—

A blacking-box composed of layers of straw-board or analogous material united by and internally coated with an adhesive cement, which renders the box proof against absorption of the moist ingredients of the blacking, and at the same time renders the box so made up of component parts substantially integral in character, substantially as specified.

In testimony whereof I have hereunto subscribed my name this 12th day of July, 1880.

NELSON O. WILCOX.

In presence of—
HERB. S. WALBRIDGE,
FRANKLIN SCOTT.